UNITED STATES PATENT OFFICE 2,269,660

METHOD OF PREVENTING THE ADHESION OF RUBBER

George E. Griffin, Cuyahoga Falls, Ohio, assignor to The B. F. Goodrich Company, New York, N. Y., a corporation of New York No Drawing. Application March 2, 1938, Serial No. 193,515

6 Claims. (Cl. 91—68)

This invention relates to the rubber working art and has as its principal object to provide a method for preventing the adhesion of unvulcanized rubber to itself and to other materials.

It is well known that rubber in its unvulcanized state, particularly if it has been subjected to mastication, has considerable surface tack. To reduce the tendency of the tacky surface to adhere to itself and to other materials, rubber has often been treated with talc, starch, mica or other comminuted materials. These materials, however, remain embedded in the surface of the rubber after vulcanization and often rendered the surface dull. These materials also hindered the proper adhesion of different portions of the rubber which were intended to be joined during vulcanization.

I have discovered that the adhesion of rubber to itself and other materials may be controlled by superposing upon the rubber surface a layer comprising of a member of the class consisting of coumarone and indene polymers and mixtures thereof. In practice, a commercial coumarone resin is usually employed. Coumarone resin, as the term is ordinarily used, refers to mixtures of coumarone and indene polymers. The coumarone and indene polymers may be present in any desired proportions, even compositions consisting of a major proportion of indene polymers usually being called coumarone resins commercially. The resins are commonly classified with reference to their melting points which may run from 50 to 160° C. or higher. The particular coumarone resin employed will depend somewhat upon the manner in which it is to be superposed on the rubber as will be hereafter explained.

In one of the most useful applications of the method of this invention, rubber labels are prevented from sticking to each other prior to vulcanization by covering them with a film of a coumarone resin. One common type of label is formed by depositing a thin layer of latex upon a form, covering with a thicker layer of masticated rubber, and stripping the composite sheet from the form. The face of this sheet, being made from latex, is not particularly tacky, but the back has ordinarily been covered with holland cloth to prevent sticking, the dusting powders mentioned above not being used since they interfered with the adhesion during vulcanization. The cloth was removed before the labels were stamped from the sheet because of the difficulty encountered in removing the cloth from the backs of numerous small pieces of unvulcanized rubber. After the labels had been stamped out of the sheet very great care was required to keep the labels apart because they adhered firmly to each other by the mere touching of two unvulcanized surfaces. By replacing the holland cloth on the back of the labels with a layer of coumarone resin, however, the labels may be dumped in a container together without sticking to each other. When a label with a layer of coumarone resin is cured in contact with rubber, the resin dissolves completely in the rubber and the adhesion of the label to the rubber article is excellent.

For use on labels, I prefer to use a medium soft coumarone resin having a melting point of from 160° to 175° F. The resin may be dissolved in any suitable solvent such as benzene, toluene, gasoline, ethyl acetate, acetone, carbon tetrachloride, etc., and may be applied by brushing, spraying, dipping, or other suitable method.

The coumarone resin layers of this invention may also be used to treat liners used to prevent the self-adhesion of sheeted rubber rolled on a reel. This is usually accomplished by impregnating a cotton fabric with a solution of a coumarone resin and driving off the solvent. Liners so treated do not adhere to the rubber. Furthermore, if any of the resin should chip off and be left on the rubber, it will be absorbed therein during vulcanization without adversely affecting quality of the product. Since rubber leaving a calender roll is rather hot, it is preferred to use a high-melting resin on liners, such as the varnish grade of coumarone resin melting from 275° to 320° F. or nearly pure indene resin melting from 300° to 320° F. When using these high-melting resins, it is often desirable to include therein a plasticizer to increase the flexibility.

Although I have herein disclosed specific embodiments of my invention, I do not intend to limit myself solely thereto. for it will be obvious to those skilled in the art that many modifications may be made without departing from the spirit and scope of the invention as defined in the appended claims.

I claim:

1. The method of preventing the adhesion of tacky unvulcanized rubber at ordinary temperature which comprises applying to the surface of the rubber a solution of a resin of the class consisting of coumarone and indene polymers and mixtures thereof, and evaporating the solvent to deposit on the rubber a continuous film consisting solely of the said resin.

2. The method of preventing the adhesion of tacky unvulcanized rubber at ordinary temperature which comprises applying to the surface of the rubber a solution of a coumarone resin, and evaporating the solvent to deposit on the rubber a continuous film consisting solely of the said resin.

3. The method of preventing the adhesion of superposed sheets of tacky unvulcanized rubber at ordinary temperature which comprises coating the surface of at least one sheet of each pair with a solution of a coumarone resin, and evaporating the solvent to deposit on the rubber a continuous film consisting solely of the said resin.

4. Tacky unvulcanized rubber having on its surface a non-tacky continuous film consisting solely of a resin of the class consisting of coumarone and indene polymers and mixtures thereof, said film having been deposited in situ upon the rubber from a solution of the resin.

5. Tacky unvulcanized rubber having on its surface a non-tacky continuous film consisting solely of a coumarone resin, said film having been deposited in situ upon the rubber from a solution of the resin.

6. Superposed sheets of tacky unvulcanized rubber, the surface of at least one sheet of each pair having on its surface a non-tacky continuous film consisting solely of a coumarone resin, said film having been deposited in situ upon the rubber from a solution of the resin.

GEORGE E. GRIFFIN.